United States Patent
Youk et al.

(10) Patent No.: US 10,676,548 B2
(45) Date of Patent: Jun. 9, 2020

(54) VINYL CHLORIDE-BASED POLYMER, METHOD OF PREPARING THE SAME, AND PLASTISOL INCLUDING THE POLYMER

(71) Applicant: LG CHEM, LTD., Seoul (KR)

(72) Inventors: Kyung Seog Youk, Daejeon (KR); Heung Kwon Bae, Daejeon (KR); Hyun Min Lee, Daejeon (KR); Jung Rae Lee, Daejeon (KR)

(73) Assignee: LG CHEM LTD., Seoul (KR)

( * ) Notice: Subject to any disclaimer, the term of this patent is extended or adjusted under 35 U.S.C. 154(b) by 0 days.

(21) Appl. No.: 15/572,688

(22) PCT Filed: Nov. 15, 2016

(86) PCT No.: PCT/KR2016/013158
§ 371 (c)(1),
(2) Date: Nov. 8, 2017

(87) PCT Pub. No.: WO2017/104978
PCT Pub. Date: Jun. 22, 2017

(65) Prior Publication Data
US 2018/0134822 A1    May 17, 2018

(30) Foreign Application Priority Data

Dec. 16, 2015 (KR) .................... 10-2015-0179879

(51) Int. Cl.
*C08F 14/06* (2006.01)
*C08F 2/22* (2006.01)
(Continued)

(52) U.S. Cl.
CPC ............... *C08F 14/06* (2013.01); *C08F 2/22* (2013.01); *C08F 259/04* (2013.01);
(Continued)

(58) Field of Classification Search
CPC .................................... C08F 14/06; C08F 2/22
See application file for complete search history.

(56) References Cited

U.S. PATENT DOCUMENTS 4,245,070 A * 1/1981 Kemp .................. C08F 259/04
525/317
4,629,772 A    12/1986 Odd
(Continued)

FOREIGN PATENT DOCUMENTS

CN         1024802 C    6/1994
CN         1165150 A   11/1997
(Continued)

*Primary Examiner* — Vu A Nguyen
(74) *Attorney, Agent, or Firm* — Dentons US LLP

(57) ABSTRACT

The present invention relates to a vinyl chloride-based polymer, a method of preparing the same, and a plastisol including the vinyl chloride-based polymer. The vinyl chloride-based polymer according to the present invention may exhibit high viscosity characteristics in a low shear region by having particle size distribution characteristics, in which particles having a relatively small particle diameter and particles having a relatively large particle diameter are distributed at a specific ratio, and may exhibit low viscosity characteristics in a high shear region due to small increases in viscosity and stress as shear rate increases, and thus, the vinyl chloride-based polymer may be easily used in a spray coating process.

Therefore, the vinyl chloride-based polymer according to the present invention and the method of preparing the same may be easily applied to industries that need them, for example, vinyl chloride-based resin industry for paste processing.

11 Claims, 4 Drawing Sheets

(51) Int. Cl.
*C08F 259/04* (2006.01)
*C08L 27/06* (2006.01)
*C08K 5/00* (2006.01)
*C08L 51/00* (2006.01)
*C09D 127/06* (2006.01)
*C09J 127/06* (2006.01)

(52) U.S. Cl.
CPC ............ *C08K 5/0016* (2013.01); *C08L 27/06* (2013.01); *C08L 51/003* (2013.01); *C08F 2500/17* (2013.01); *C08F 2500/19* (2013.01); *C08F 2500/24* (2013.01); *C09D 127/06* (2013.01); *C09J 127/06* (2013.01)

(56) References Cited

U.S. PATENT DOCUMENTS

| | | | | |
|---|---|---|---|---|
| 4,981,889 | A * | 1/1991 | Baba | C08K 13/06 |
| | | | | 524/109 |
| 5,296,575 | A * | 3/1994 | Grossoleil | C08F 14/06 |
| | | | | 526/212 |
| 5,300,551 | A * | 4/1994 | Candries | C08F 14/06 |
| | | | | 523/201 |
| 5,958,586 | A | 9/1999 | Grossoleil et al. | |
| 2004/0077765 | A1* | 4/2004 | Massillon | C08F 14/06 |
| | | | | 524/458 |
| 2009/0311531 | A1* | 12/2009 | Youk | C08F 2/22 |
| | | | | 428/402 |
| 2012/0123077 | A1* | 5/2012 | Shin | C08F 14/06 |
| | | | | 526/344.2 |
| 2018/0057676 | A1 | 3/2018 | Bae et al. | |

FOREIGN PATENT DOCUMENTS

| | | |
|---|---|---|
| CN | 107531970 A | 1/2018 |
| EP | 0025561 A1 | 3/1981 |
| EP | 0030524 A2 | 6/1981 |
| EP | 3263642 A1 | 1/2018 |
| JP | 05-005068 A | 1/1993 |
| JP | 07-304920 A | 11/1995 |
| JP | H09309998 A | 12/1997 |
| JP | 10-231322 A | 9/1998 |
| JP | 2970659 B2 | 11/1999 |
| JP | 2005-264036 A | 9/2005 |
| KR | 20110139326 A | 12/2011 |
| KR | 10-2013-0009718 A | 1/2013 |
| KR | 10-2015-0030994 A | 3/2015 |

\* cited by examiner

VINYL CHLORIDE-BASED POLYMER, METHOD OF PREPARING THE SAME, AND PLASTISOL INCLUDING THE POLYMER

This application is a National Stage Entry of International Application No. PCT/KR2016/013158, filed on Nov. 15, 2016, and claims the benefit of and priority to Korean Application No. 10-2015-0179879, filed on Dec. 16, 2015, all of which are hereby incorporated by reference in their entirety for all purposes as if fully set forth herein.

TECHNICAL FIELD

Cross-Reference to Related Applications

This application claims the benefit of Korean Patent Application No. 10-2015-0179879, filed on Dec. 16, 2015, in the Korean Intellectual Property Office, the disclosure of which is incorporated herein in its entirety by reference.

Technical Field

The present invention relates to a vinyl chloride-based polymer which exhibits high viscosity characteristics in a low shear region and exhibits low viscosity characteristics as shear rate increases, a method of preparing the same, and a plastisol including the vinyl chloride-based polymer.

BACKGROUND ART

A vinyl chloride-based polymer is a resin containing 50% or more of vinyl chloride, wherein it has various applications because it is inexpensive, its hardness is easily controlled, and it is applicable to most processing equipments. In addition, since the vinyl chloride-based polymer may provide a molded article having excellent physical and chemical properties such as mechanical strength, weather resistance, and chemical resistance, the vinyl chloride-based polymer is being widely used in many fields.

The vinyl chloride-based polymer is prepared in different forms depending on the application. For example, a vinyl chloride-based polymer for straight processing, such as an extrusion process, a calendaring process, and an injection process, is generally prepared by suspension polymerization, and a vinyl chloride-based polymer for paste processing, such as dipping, spraying, and coating, is prepared by emulsion polymerization.

In the paste processing, a vinyl chloride-based polymer latex for paste processing obtained by emulsion polymerization is generally dried by a spray drying method to form final resin particles, and the particles are dispersed in a solvent or a plasticizer and used in products, such as a flooring material, wallpaper, a tarpaulin, a raincoat, gloves, an automotive underbody coating, a sealant, and carpet tiles, through a process such as reverse roll-coating, knife coating, screen coating, spray coating, gravure and screen printing, rotation casting, and shell casting and dipping.

The vinyl chloride-based polymer for paste processing is difficult to be applied alone due to low processability and is normally processed and used in the form of a plastisol which is composed of various additives, such as a heat stabilizer, as well as a plasticizer, and, in this case, in order to obtain excellent processability, it is important to maintain good flowability by reducing viscosity of the plastisol.

In particular, with respect to a vinyl chloride-based polymer used in a sealant or an automotive underbody coating, the vinyl chloride-based polymer is coated on an adherend by spray coating and then subjected to a drying process, wherein, in a case in which viscosity of the vinyl chloride-based polymer is low, the vinyl chloride-based polymer is formed into droplets or is detached from the adherend while having fluidity due to gravity before drying. As a result, since a coating thickness becomes non-uniform and the vinyl chloride-based polymer is thinly formed at a specific site, failure may occur.

Also, in order to use the vinyl chloride-based polymer in a coating process using spray coating, flow characteristics of a pseudoplastic fluid, in which viscosity and stress are reduced as shear rate increases, must be achieved.

Thus, in order to use the vinyl chloride-based polymer in a sealant or an automotive underbody coating through a coating process using paste processing, for example, spray coating, there is a need to develop a vinyl chloride-based polymer which may exhibit high viscosity characteristics in a region of low shear rate or zero shear rate and may have characteristics in which viscosity and stress are reduced as the shear rate increases.

DISCLOSURE OF THE INVENTION

Technical Problem

The present invention provides a vinyl chloride-based polymer which exhibits high viscosity characteristics in a low shear region and exhibits low viscosity characteristics due to small increases in viscosity and stress as shear rate increases.

The present invention also provides a method of preparing the vinyl chloride-based polymer.

The present invention also provides a plastisol including the vinyl chloride-based polymer.

Technical Solution

According to an aspect of the present invention, there is provided a vinyl chloride-based polymer, with a particle size distribution which represents a weight ratio of polymer particles belonging to a certain particle diameter range to total polymer particles, wherein 51 wt % to 90 wt % of a weight of the total polymer particles has a particle diameter of 0.1 µm to 0.29 µm, and 10 wt % to 49 wt % of the weight of the total polymer particles has a particle diameter of 0.3 µm to 3.0 µm.

According to another aspect of the present invention, there is provided a method of preparing the vinyl chloride-based polymer which includes emulsion polymerizing a vinyl chloride-based monomer in the presence of seed particles.

According to another aspect of the present invention, there is provided a plastisol including the vinyl chloride-based polymer.

Advantageous Effects

A vinyl chloride-based polymer according to the present invention may exhibit high viscosity characteristics in a low shear region by having particle size distribution characteristics, in which particles having a relatively small particle diameter and particles having a relatively large particle diameter are distributed at a specific ratio, and may exhibit relatively low viscosity characteristics due to small increases in viscosity and stress as shear rate increases, and thus, the vinyl chloride-based polymer according to the present invention may be easily used in a spray coating process.

Also, a method of preparing a vinyl chloride-based polymer according to the present invention may prepare the vinyl chloride-based polymer having a specific particle size distribution by performing emulsion polymerization in the presence of a constant amount of seed particles.

Thus, the vinyl chloride-based polymer according to the present invention and the method of preparing the same may be easily applied to industries that need them, for example, vinyl chloride-based resin industry for paste processing.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
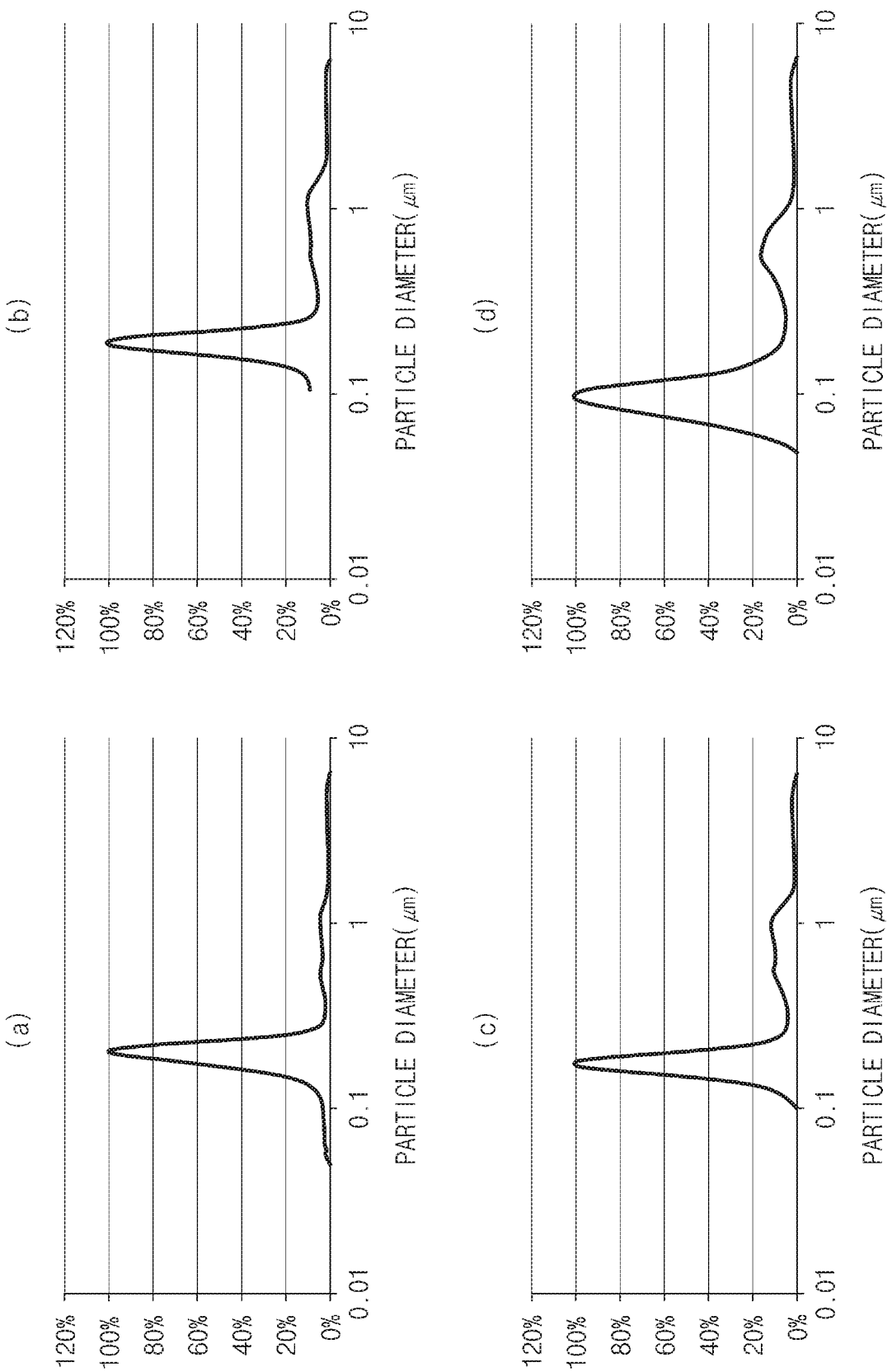
FIG. 1 illustrates the results of particle size distribution analysis of vinyl chloride-based polymers according to an embodiment of the present invention, wherein (a) is an analysis graph of a vinyl chloride polymer of Example 1, (b) is an analysis graph of a vinyl chloride polymer of Example 2, (c) is an analysis graph of a vinyl chloride polymer of Example 3, and (d) is an analysis graph of a vinyl chloride polymer of Example 4.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The expression "peak particle diameter ($D_p$)" used in the present invention denotes a particle diameter corresponding to the maximum value of a particle size distribution.

The expression "degree of polymerization" used in the present invention denotes the number of basic units constituting a polymer, and, for example, may denote the number of monomer units constituting the polymer included in a polymer chain.

The present invention provides a vinyl chloride-based polymer which may exhibit high viscosity characteristics in a low shear region and may exhibit low viscosity characteristics in a high shear region.

A vinyl chloride-based polymer is being applied in various fields, and has been prepared and used for straight processing or paste processing depending on the application thereof. The vinyl chloride-based polymer for paste processing is dispersed in a solvent or a plasticizer to be prepared as a plastisol and is then being used in various products, for example, a sealant or an automotive underbody coating, by a process such as spray coating.

In this case, in a case in which viscosity of the vinyl chloride-based polymer is low, since a coating becomes non-uniform while the vinyl chloride-based polymer has fluidity before drying after the coating and the vinyl chloride-based polymer is thinly formed at a specific site, failure may occur.

Also, in order to easily use the vinyl chloride-based polymer in spray coating, flow characteristics of a pseudo-plastic fluid, in which viscosity and stress are reduced as shear rate increases, must be achieved.

Thus, the present invention provides a vinyl chloride-based polymer which may exhibit high viscosity characteristics in a low shear region or a region of zero shear rate and may exhibit relatively low viscosity characteristics in a high shear region due to small increases in viscosity and stress as the shear rate increases.

In a particle size distribution which represents a weight ratio of polymer particles belonging to a certain particle diameter range to total polymer particles, the vinyl chloride-based polymer according to an embodiment of the present invention is characterized in that 51 wt % to 90 wt % of 100 wt % of the total polymer particles has a particle diameter of 0.1 μm to 0.29 μm, and 10 wt % to 49 wt % of the weight of the total polymer particles has a particle diameter of 0.3 μm to 3.0 μm.

Furthermore, the vinyl chloride-based polymer may have a degree of polymerization of 700 to 2,000. Specifically, the vinyl chloride-based polymer may have a degree of polymerization of 1,000 to 1,500.

Specifically, as described above, the vinyl chloride-based polymer according to the embodiment of the present invention may have particle size distribution characteristics in which 51 wt % to 90 wt % of the weight of the total polymer particles has a particle diameter of 0.1 μm to 0.29 μm (hereinafter, referred to as 'particle diameter S'), and 10 wt % to 49 wt % of the weight of the total polymer particles has a particle diameter of 0.3 μm to 3.0 μm (hereinafter, referred to as 'particle diameter L') at a degree of polymerization of 700 to 2,000, and, for example, with respect to the vinyl chloride-based polymer, 65 wt % to 80 wt % of the weight of the total polymer particles may have particle diameter S and 20 wt % to 35 wt % of the weight of the total polymer particles may have particle diameter L at the above degree of polymerization. In a case in which less than 51 wt % of the weight of the total polymer particles has the particle diameter S, the viscosity may be increased in the high shear region, and, in a case in which greater than 90 wt % of the weight of the total polymer particles has the particle diameter S, viscosity stability may be reduced.

Also, the vinyl chloride-based polymer may have a peak particle diameter ($D_p$) of 0.17 μm to 0.29 μm.

In the present invention, samples are prepared by diluting the vinyl chloride-based polymer to 1 wt % with deionized water, and the particle size distribution, particle diameter, and peak particle diameter may be measured using a particle size analyzer (DC24000 UHR, CPS Instruments).

0.2 g of the vinyl chloride-based polymer is added to 25 ml of cyclohexanone and completely dissolved at 120° C. for 2 hours, and the degree of polymerization may then be measured using an Ubbelohde viscometer.

Since the vinyl chloride-based polymer according to the embodiment of the present invention has the particle size distribution as described above, the vinyl chloride-based polymer according to the embodiment of the present invention may exhibit high viscosity characteristics in the low shear region and may exhibit low viscosity characteristics in the high shear region.

Specifically, the vinyl chloride-based polymer may have a viscosity of 1.3 Pa·s to 2.4 Pa·s at a shear rate of 500 $s^{-1}$ and may have a yield stress of 110 Pa to 260 Pa at a shear rate of 10 $s^{-1}$. Herein, the yield stress of the polymer is a physical property that may be related to viscosity characteristics of the polymer, wherein it may denote that the higher the yield stress of the polymer is, the higher the viscosity may be. Thus, a high value of the yield stress at the shear rate of 10 $s^{-1}$ may indicate high viscosity characteristics in the low shear region.

In this case, 100 g of the vinyl chloride-based polymer and 120 g of dioctyl phthalate are stirred by using a WERKE mixer (EUROSTAR IKA) at 800 rpm for 10 minutes to prepare a plastisol and the viscosity characteristics of the vinyl chloride-based polymer depending on shear rate may be measured using a rheometer (AR2000EX peltier plate, TA Instruments) with a 40 mm parallel plate fixture and a gap of 500 μm. In this case, the measurement is performed through a first step (preliminary shear step) in which the shear rate is set to 10 $s^{-1}$ for 30 seconds, a second step (ramp-up step) in which the shear rate is increased from 10 $s^{-1}$ to 500 $s^{-1}$ for 120 seconds, a third step (holding step) in which the shear rate is maintained at 500 $s^{-1}$ for 180 seconds, and a fourth step (ramp-down step) in which the shear rate is reduced from 500 $s^{-1}$ to 10 $s^{-1}$ for 120 seconds, wherein the viscosity at a shear rate of 500 $s^{-1}$ is measured in the third step and the yield stress at a shear rate of 10 $s^{-1}$ is measured at the start of the second step.

That is, the viscosity characteristics of the vinyl chloride-based polymer may represent viscosity characteristics of the plastisol including the vinyl chloride-based polymer, and the viscosity characteristics may be exhibited from the vinyl chloride-based polymer.

The vinyl chloride-based polymer may be prepared by a preparation method to be described later using a vinyl chloride-based monomer, and a vinyl chloride-based polymer having the above-described particle size distribution may be obtained.

The vinyl chloride-based monomer may denote a vinyl chloride monomer alone or may denote a mixture of a vinyl chloride monomer and a vinyl-based monomer copolymerizable therewith. That is, the vinyl chloride-based polymer according to the embodiment of the present invention may be a vinyl chloride homopolymer or may be a copolymer of a vinyl chloride monomer and a vinyl-based monomer copolymerizable therewith. In a case in which the vinyl chloride-based polymer is the copolymer, vinyl chloride may be included in an amount of 50% or more.

The vinyl-based monomer copolymerizable with the vinyl chloride-based monomer is not particularly limited, but, for example, may be an olefin compound such as ethylene, propylene, and butene; vinyl esters such as vinyl acetate, vinyl propionate, and vinyl stearate; unsaturated nitriles such as acrylonitrile; vinyl alkyl ethers such as vinyl methyl ether, vinyl ethyl ether, vinyl octyl ether, and vinyl lauryl ether; halogenated vinylidenes such as vinylidene chloride; an unsaturated fatty acid such as acrylic acid, methacrylic acid, itaconic acid, maleic acid, fumaric acid, maleic anhydride, and itaconic anhydride, and anhydrides of these fatty acids; unsaturated fatty acid esters such as methyl acrylate, ethyl acrylate, monomethyl maleate, dimethyl maleate, and butyl benzyl maleate; and a crosslinkable monomer such as diallyl phthalate, and the vinyl-based monomer may be used alone or in a combination of two or more thereof.

Furthermore, the present invention provides a method of preparing the vinyl chloride-based polymer.

The method of preparing the vinyl chloride-based polymer according to an embodiment of the present invention includes a step (step A) of emulsion polymerizing a vinyl chloride-based monomer in the presence of seed particles.

The emulsion polymerization of step A is a step for preparing a vinyl chloride-based polymer and may be performed by adding a vinyl chloride-based monomer to a reactor, in which seed particles and polymerized water are mixed, and performing a reaction.

The seed particles may have an average particle diameter of 0.1 μm to 1.0 μm, and may be used in an amount of 0.5 part by weight to 1.5 parts by weight based on 100 parts by weight of the vinyl chloride-based monomer. In a case in which the seed particles are used in an amount outside the above range, the finally prepared vinyl chloride-based polymer may not have desired particle size distribution characteristics, and, as a result, may not exhibit low viscosity characteristics in the high shear region while exhibiting high viscosity characteristics in the low shear region.

The seed particles may be prepared by adding the vinyl chloride-based monomer to the polymerization reactor, performing homogenization, and then performing emulsion polymerization. Specifically, the seed particles may be prepared by adding 100 parts by weight of the vinyl chloride-based monomer and 0.1 part by weight to 5 parts by weight of an emulsifier to the polymerization reactor filled with a polymerization initiator, performing homogenization, and then performing emulsion polymerization at a temperature of 30° C. to 70° C. In this case, the emulsifier may be the same as a first emulsifier to be described later.

The polymerization reactor filled with the polymerization initiator may denote a polymerization reactor in which a mixed solution including the polymerization initiator is contained, and the mixed solution may further include polymerized water, a reaction inhibitor, and a dispersant in addition to the polymerization initiator, but the present invention is not limited thereto.

The polymerization initiator may be used in an amount of 0.01 part by weight to 2 parts by weight based on 100 parts by weight of the vinyl chloride-based monomer. The polymerization initiator is not particularly limited, but, for example, may be at least one selected from the group consisting of peroxy carbonates, peroxyesters, and azo-based compounds. Specifically, with respect to the polymerization initiator, lauryl peroxide (LPO), di-2-ethylhexyl peroxydicarbonate (OPP), diisopropyl peroxydicarbonate, t-butyl peroxypivalate, t-butyl peroxyneodecanoate, and 2,2-azobisisobutyronitrile may be used alone or in a mixture of two or more thereof.

The reaction inhibitor is not particularly limited, but, for example, paraquinone, hydroquinone, butylated hydroxytoluene, monomethyl ether hydroquinone, quaternary butyl catechol, diphenylamine, triisopropanolamine, and triethanolamine may be used. Also, the dispersant is not particularly limited, but, for example, higher alcohols, such as lauryl alcohol, myristic alcohol, and stearyl alcohol; or higher fatty acids, such as lauric acid, myristic acid, palmitic acid, and stearic acid, may be used.

The homogenization may be performed by homogenizing for 1 hour to 3 hours using a homogenizer at a temperature of 20° C. or less, particularly at a temperature of 5° C. to 15° C. In this case, the homogenizer is not particularly limited, but a conventional homogenizer known in the art may be used, and, for example, a rotor-stator type homogenizer may be used.

The emulsion polymerization for the preparation of the seed particles may be performed at a temperature of 30° C. to 70° C. as described above, and, specifically, the emulsion polymerization may be initiated by increasing the temperature by 30° C. to 50° C. from the homogenization temperature and may be performed by performing polymerization for 5 hours to 15 hours.

The vinyl chloride-based monomer used in the emulsion polymerization of step A and the vinyl chloride-based monomer used in the seed particles may be the same material, and, as described above, the vinyl chloride-based monomer may be a vinyl chloride monomer, or may be a combination of a vinyl chloride monomer and a vinyl-based monomer copolymerizable therewith. Specific types of the vinyl-based monomer may be the same as described above.

Also, a first emulsifier, a second emulsifier, and a water-soluble polymerization initiator may be further used in the emulsion polymerization of step A, if necessary. In this case, the first emulsifier and water-soluble polymerization initiator may be added before the vinyl chloride-based monomer is added to the reactor in which the seed particles and the polymerized water are mixed, and the second emulsifier may be continuously added after the initiation of the polymerization.

The polymerized water may be used in an amount of 70 parts by weight to 120 parts by weight based on 100 parts by weight of the vinyl chloride-based monomer, and the polymerized water may be deionized water.

The water-soluble polymerization initiator may be used in an amount of 0.01 part by weight to 2.0 parts by weight based on 100 parts by weight of the vinyl chloride-based monomer, but the present invention is not limited thereto. The water-soluble polymerization initiator is not particularly limited, but may, for example, be at least one selected from the group consisting of potassium persulfate, ammonium persulfate, and hydrogen peroxide.

The first emulsifier may be used in an amount of 0.02 part by weight to 0.4 part by weight based on 100 parts by weight of the vinyl chloride-based monomer.

The second emulsifier is continuously added after the initiation of the polymerization as described above, and may be used in an amount of 0.01 part by weight to 6 parts by weight based on 100 parts by weight of the vinyl chloride-based monomer.

In the present invention, the first emulsifier and the second emulsifier may be different materials from each other or may be the same material, and, in a case in which the first emulsifier and the second emulsifier are the same material, the expressions "first" and "second" may be used to distinguish the order of the addition of the emulsifiers. Specifically, the first emulsifier and the second emulsifier each may be at least one selected from the group consisting of sodium lauryl sulfate, lauryl benzene sulfonic acid, alpha-olefin sulfonate, sodium lauryl ethoxylated sulfate, sodium octadecyl sulfate, sodium lauryl ether sulfate, and linear alkylbenzene sulfonate.

In the emulsion polymerization of step A according to an embodiment of the present invention, an additive, such as a dispersant and a reaction inhibitor, may be further used if necessary, and the dispersant and the reaction inhibitor may respectively be the same as the dispersant and the reaction inhibitor used in the preparation of the above-described seed particles.

The preparation method according to the embodiment of the present invention may further include at least one step of washing, coagulating, and drying, after the emulsion polymerization of step A. The drying is not particularly limited and may be performed by a method known in the art.

In addition, the present invention provides a plastisol including the vinyl chloride-based polymer.

The plastisol according to an embodiment of the present invention may further include 40 parts by weight to 120 parts by weight of a plasticizer based on 100 parts by weight of the vinyl chloride-based polymer, and may further include an additive, such as a dispersion diluent, a heat stabilizer, a viscosity modifier, and a foaming agent, if necessary.

The expression "plastisol" used in the present invention denotes a mixture, in which a resin and a plasticizer are mixed so that the mixture may be molded, casted, or processed in the form of a continuous film by heating, and, for example, may denote a paste form in which the vinyl chloride-based polymer and the plasticizer are mixed.

The expression "plasticizer" used in the present invention may denote an organic additive material which plays a role in improving high-temperature moldability of a thermoplastic resin by being added to the resin to increase thermoplasticity.

Those known in the art may be used as the plasticizer and the additive.

The plastisol according to the embodiment of the present invention may have the above-described viscosity characteristics by including the vinyl chloride-based polymer having specific particle size distribution characteristics.

Hereinafter, the present invention will be described in more detail, according to specific examples and experimental examples. However, the following examples and experimental examples are merely presented to exemplify the present invention, and the scope of the present invention is not limited thereto.

Example 1

(1) Seed Particle Preparation 73 kg of deionized water, 1.21 kg of lauryl peroxide (LPO), and 0.9 g of paraquinone were added to a 200 l high-pressure reactor and the reactor was evacuated to a vacuum of −730 mmHg. 66 kg of a vinyl chloride monomer and 7.8 kg of sodium dodecylbenzene sulfonate were added to the reactor in a vacuum state and mixed by stirring for 15 minutes. An internal temperature of the reactor was decreased to 20° C. or less and homogenization was performed for 2 hours by using a rotor-stator type homogenizer. After the completion of the homogenization, the internal temperature of the reactor was set to 42° C. and polymerization was performed. When a pressure of the reactor leached 3.5 kg/cm$^2$ after 558 minutes, the reaction was terminated and the unreacted vinyl chloride monomer was recovered and removed to obtain seed particles having an average particle diameter of 0.6 μm.

(2) Vinyl Chloride Polymer Preparation 180 kg of polymerized water, 514 g of sodium lauryl sulfate, 110 g of potassium persulfate (KPS), and 0.9 kg (0.5 part by weight) of the seed particles of (1) were added to a 500 l high-pressure reactor and the reactor was then evacuated while stirring. 180 kg (100 parts by weight) of a vinyl chloride monomer was added to the reactor in a vacuum state and the temperature of the reactor was then increased to 54° C. to initiate polymerization. After the initiation of the polymerization, 18 kg of sodium lauryl sulfate was continuously added to the reactor for 6 hours. Thereafter, when a pressure of the reactor leached 4 kg/cm$^2$, the reaction was terminated and the unreacted vinyl chloride monomer was recovered and removed to prepare a vinyl chloride polymer.

Example 2

A vinyl chloride polymer was prepared in the same manner as in Example 1 except that 1.8 kg (1.0 part by weight) of the seed particles was used during the preparation of the vinyl chloride polymer.

Example 3

A vinyl chloride polymer was prepared in the same manner as in Example 1 except that 2.25 kg (1.25 parts by weight) of the seed particles was used during the preparation of the vinyl chloride polymer.

Example 4

A vinyl chloride polymer was prepared in the same manner as in Example 1 except that 2.7 kg (1.5 parts by weight) of the seed particles was used during the preparation of the vinyl chloride polymer.

Comparative Example 1

230 kg of polymerized water, 740 g of sodium lauryl sulfate, and 110 g of potassium persulfate (KPS) were added to a 500 l high-pressure reactor and the reactor was then evacuated while stirring. 185 kg of a vinyl chloride monomer was added to the reactor in a vacuum state and the temperature of the reactor was then increased to 56° C. to initiate polymerization. After the initiation of the polymerization, 11.1 kg of sodium lauryl sulfate was continuously added to the reactor for 5 hours. Thereafter, when a pressure of the reactor leached 4 kg/cm$^2$, the reaction was terminated and the unreacted vinyl chloride monomer was recovered and removed to prepare a vinyl chloride polymer.

Comparative Example 2

180 kg of polymerized water, 116 g of sodium lauryl sulfate, and 110 g of potassium persulfate (KPS) were added to a 500 l high-pressure reactor and the reactor was then evacuated while stirring. 180 kg of a vinyl chloride monomer was added to the reactor in a vacuum state and the temperature of the reactor was then increased to 54° C. to initiate polymerization. After the initiation of the polymerization, 18 kg of sodium lauryl sulfate was continuously added to the reactor for 6 hours. Thereafter, when a pressure of the reactor leached 4 kg/cm$^2$, the reaction was terminated and the unreacted vinyl chloride monomer was recovered and removed to prepare a vinyl chloride polymer.

Comparative Example 3

(1) First Seed Particle Preparation
73 kg of deionized water, 1.21 kg of lauryl peroxide (LPO), and 0.9 g of paraquinone were added to a 200 l high-pressure reactor and the reactor was evacuated to a vacuum of −730 mmHg. 66 kg of a vinyl chloride monomer and 7.8 kg of sodium dodecylbenzene sulfonate were added to the reactor in a vacuum state and mixed by stirring for 15 minutes. An internal temperature of the reactor was decreased to 20° C. or less and homogenization was performed for 2 hours by using a rotor-stator type homogenizer. After the completion of the homogenization, the internal temperature of the reactor was set to 42° C. and polymerization was performed. When a pressure of the reactor leached 3.5 kg/cm$^2$ after 558 minutes, the reaction was terminated and the unreacted vinyl chloride monomer was recovered and removed to obtain seed particles having an average particle diameter of 0.6 μm.

(2) Second Seed Particle Preparation
230 kg of deionized water, 1 kg of a first emulsifier (lauric acid 790 g/NaOH 240 g), and 110 g of potassium persulfate (KPS) were added to a 500 l high-pressure reactor and the reactor was then evacuated while stirring. 185 kg of a vinyl chloride monomer was added to the reactor in a vacuum state and the temperature of the reactor was then increased to 56° C. to initiate polymerization. After the initiation of the polymerization, 11.1 kg of a second emulsifier (sodium dodecylbenzene sulfonate) was continuously added to the reactor for 5 hours. When a pressure of the reactor leached 4 kg/cm$^2$, the reaction was terminated and the unreacted vinyl chloride monomer was recovered and removed to prepare second seed particles having an average particle diameter of 0.12 μm.

(3) Vinyl Chloride Polymer Preparation
170 kg of polymerized water, 22 kg of the first seed particles having an average particle diameter of 0.6 μm, and 14 kg of the second seed particles having an average particle diameter of 0.12 μm were added to a 500 l high-pressure reactor and the reactor was then evacuated while stirring. 185 kg of a vinyl chloride monomer was added to the reactor in a vacuum state and the temperature of the reactor was then increased to 58° C. to perform seed emulsion polymerization. When the polymerization reaction was started, 7 kg of sodium lauryl sulfate was continuously added to the reactor. When a pressure of the reactor leached 4 kg/cm$^2$ after 300 minutes, the reaction was terminated and the unreacted vinyl chloride monomer was recovered and removed to prepare a vinyl chloride polymer.

Experimental Example (1) Particle Size Distribution Characteristic Analysis
In order to comparatively analyze physical properties of each vinyl chloride polymer prepared in Examples 1 to 4 and Comparative Examples 1 to 3, particle size distribution characteristics of each vinyl chloride polymer were analyzed, and the results thereof are presented in Table 1 below and FIGS. 1 to 3.
Samples were prepared by diluting each vinyl chloride-based polymer to 1 wt % with deionized water, and the particle size distribution characteristics were measured using a particle size analyzer (DC24000 UHR, CPS Instruments).

(2) Viscosity and Flow Characteristic Analysis
In order to comparatively analyze viscosity and flow characteristics of each vinyl chloride polymer prepared in Examples 1 to 4 and Comparative Examples 1 to 3, viscosity characteristics and flow characteristics of each vinyl chloride polymer depending on shear rate were analyzed. The results thereof are presented in Table 1 below and FIG. 4.

First, 100 g of each vinyl chloride polymer and 120 g of dioctyl phthalate (DOP) were stirred by using a Werke mixer (EUROSTAR IKA) at 800 rpm for 10 minutes to prepare each plastisol.

The flow characteristics and the viscosity characteristics of each plastisol were measured using a rheometer (AR2000EX peltier plate, TA Instruments) with a 40 mm parallel plate fixture and a gap of 500 μm. In this case, the measurement was performed through a first step (preliminary shear step) in which the shear rate was set to 10 s$^{-1}$ for 30 seconds, a second step (ramp-up step) in which the shear rate was increased from 10 s$^{-1}$ to 500 s$^{-1}$ for 120 seconds, a third step (holding step) in which the shear rate was maintained at 500 s$^{-1}$ for 180 seconds, and a fourth step (ramp-down step) in which the shear rate was reduced from 500 s$^{-1}$ to 10 s$^{-1}$ for 120 seconds.

Furthermore, with respect to the vinyl chloride polymer of Comparative Example 2, yield stress in a low shear region in the second (ramp-up) step and yield stress in a low shear region in the fourth (ramp-down) step were low, and thixotropy was 45%, showing a relatively low recovery rate, while the yield stress in the low shear region of the fourth step was significantly reduced.

In addition, with respect to the vinyl chloride polymer of Comparative Example 3, although thixotropy was 70%, showing a high recovery rate, significantly low values of yield stresses in the low shear regions of the second and fourth steps were generally obtained. This result indicated that the vinyl chloride polymer of Comparative Example 3 had significantly low viscosity in the low shear region, and thus, the vinyl chloride polymer of Comparative Example 3

TABLE 1

| Category | Peak particle diameter of minimum particle (μm) | Particle diameter S distribution (wt %) | Particle diameter L distribution (wt %) | Yield stress (at 10 s$^{-1}$, Pa) 2$^{nd}$ step (ramp-up) | Yield stress (at 10 s$^{-1}$, Pa) 4$^{th}$ step (ramp-down) | Thix-otropy (%) | Viscosity (at 500 s$^{-1}$, Pa · s) |
|---|---|---|---|---|---|---|---|
| Example 1 | 0.194 | 88.26 | 11.74 | 259 | 187 | 72 | 2.367 |
| Example 2 | 0.186 | 79.03 | 20.97 | 175 | 118 | 67 | 1.853 |
| Example 3 | 0.178 | 67.69 | 32.31 | 146 | 112 | 77 | 1.415 |
| Example 4 | 0.235 | 51.22 | 48.78 | 116 | 82 | 71 | 1.367 |
| Comparative Example 1 | 0.173 | 100 | 0 | 296 | 112 | 38 | 2.854 |
| Comparative Example 2 | 0.282 | 100 | 0 | 60 | 27 | 45 | 1.746 |
| Comparative Example 3 | 0.26 | 34.11 | 65.89 | 10 | 7 | 70 | 0.587 |

Figure 2:
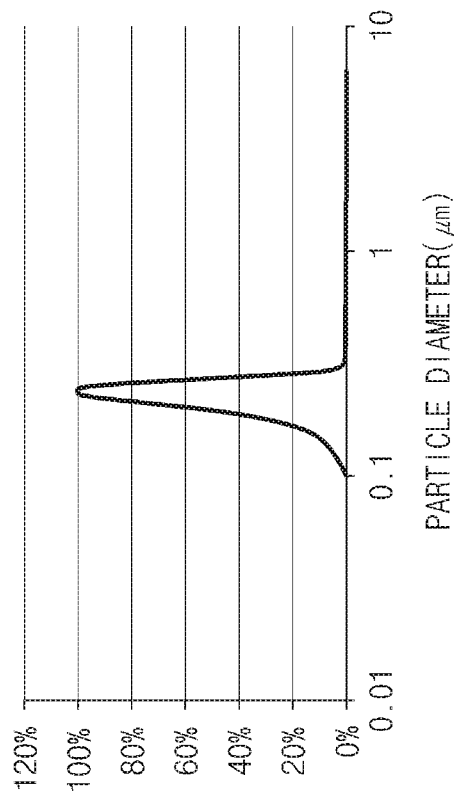
FIG. 2 illustrates the results of particle size distribution analysis of vinyl chloride-based polymers according to the embodiment of the present invention, wherein (a) is an analysis graph of a vinyl chloride polymer of Comparative Example 1, (b) is an analysis graph of a vinyl chloride polymer of Comparative Example 2, and (c) is an analysis graph of a vinyl chloride polymer of Comparative Example 3.
Figure 2:
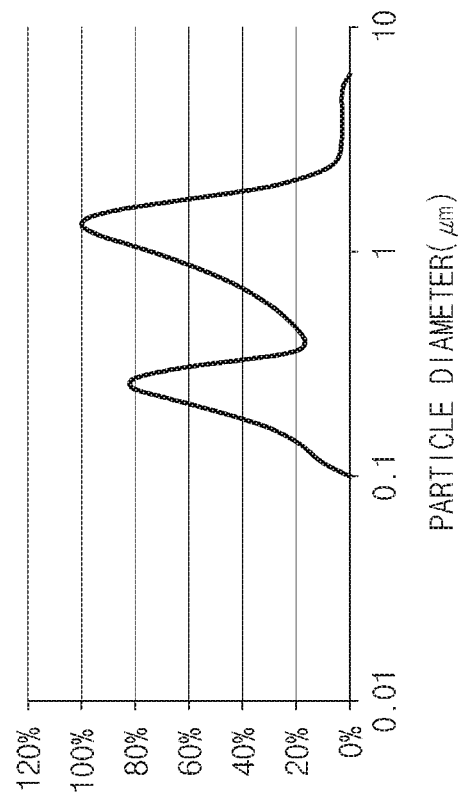
Figure 2:
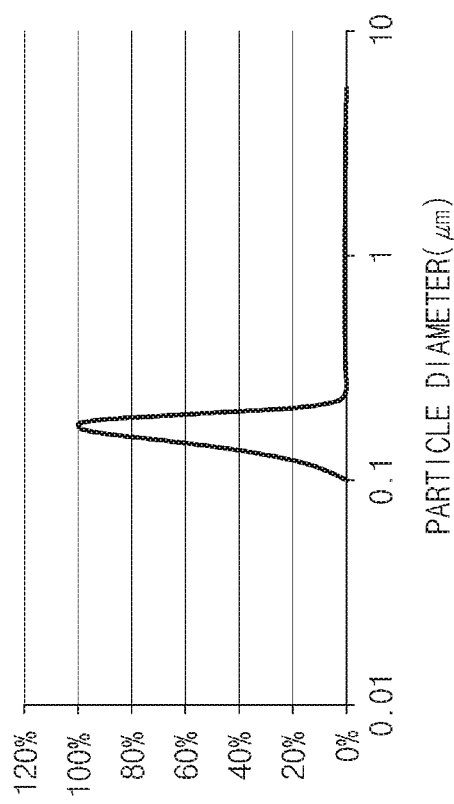
Figure 3:
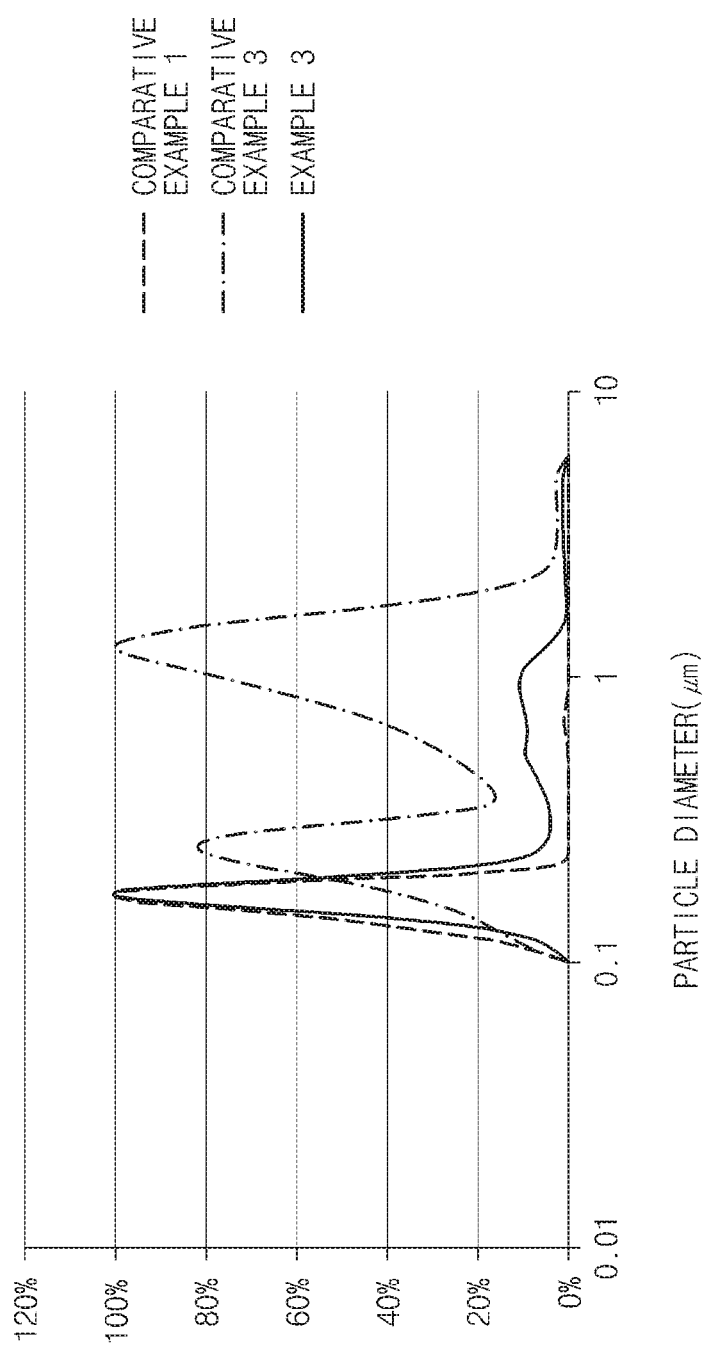
FIG. 3 is a graph showing results of comparative analysis of particle size distributions of the vinyl chloride polymers of Example 3 according to the embodiment of the present invention and Comparative Examples 1 and 3.

* particle diameter S: particles having a particle diameter of 0.1 μm to 0.29 μm
* particle diameter L: particles having a particle diameter of 0.3 μm to 3.0 μm As illustrated in Table 1 and FIGS. 1 to 3, the vinyl chloride polymers of Examples 1 to 4 according to the present invention had a particle size distribution, in which a ratio of particles having a particle diameter of 0.1 μm to 0.29 μm was 51 wt % or more and a ratio of particles having a particle diameter of 0.3 μm to 3.0 μm was 49 wt % or less, while having a single peak particle size distribution. In contrast, particles having a particle diameter of 0.1 μm to 0.29 μm were only present in the vinyl chloride polymers of Comparative Examples 1 and 2, and the vinyl chloride polymer of Comparative Example 3 had characteristics of a bimodal particle size distribution in which a weight ratio of particles having a particle diameter of 0.1 μm to 0.29 μm to particles having a particle diameter of 0.3 μm to 3.0 μm was about 66:34.

Figure 4:
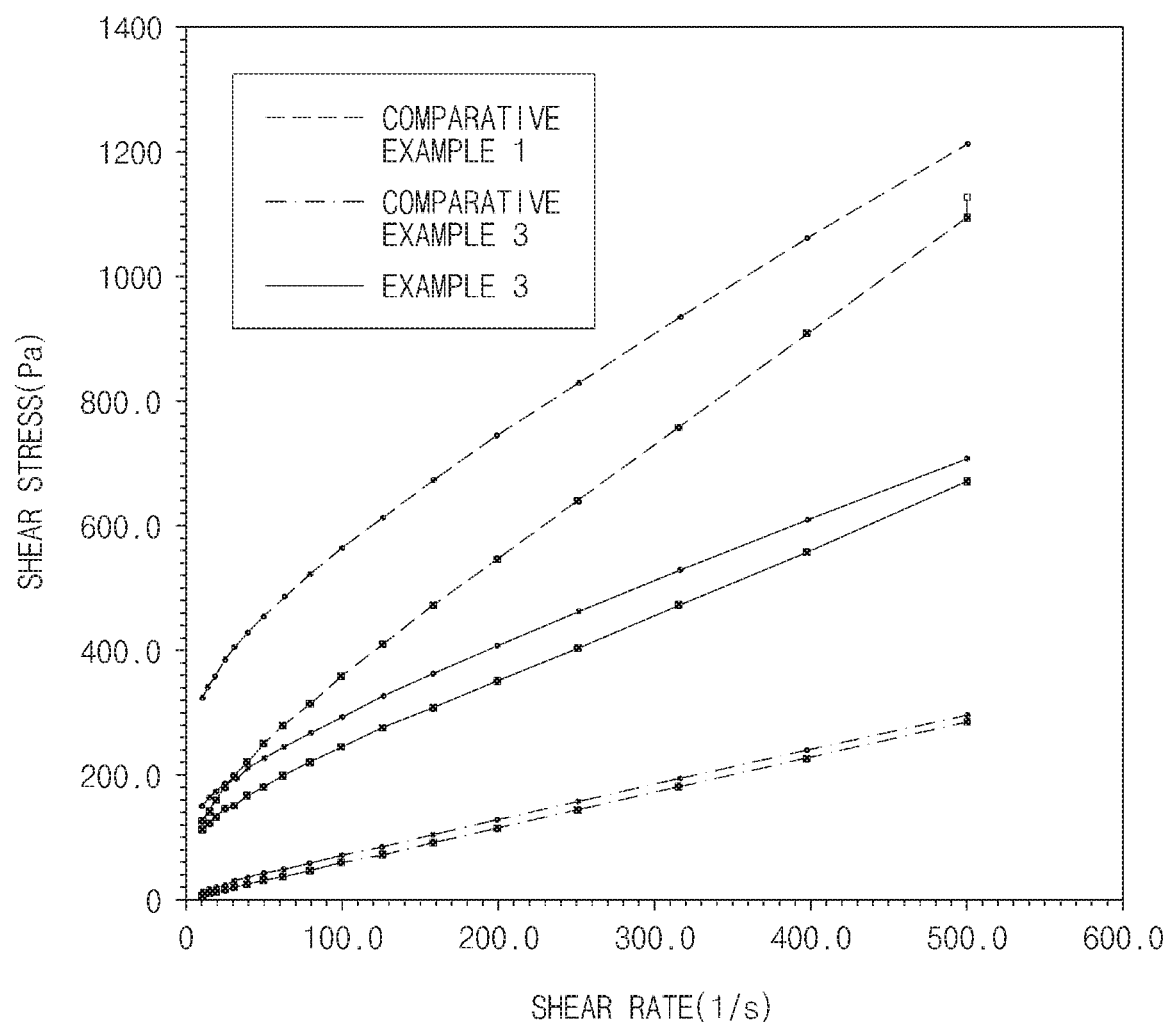
FIG. 4 is a graph showing shear stress variation depending on shear regions of the vinyl chloride polymers of Example 3 according to the embodiment of the present invention and Comparative Examples 1 and 3.

Also, as illustrated in Table 1 and FIG. 4, it was confirmed that the vinyl chloride polymers of Examples 1 to 4 according to the present invention had better thixotropy than the vinyl chloride polymers of Comparative Examples 1 to 3 and exhibited low viscosity characteristics in a high shear region (500 s$^{-1}$).

Specifically, with respect to the vinyl chloride polymer of Comparative Example 1, yield stress in a low shear region (10 s$^{-1}$) in the second (ramp-up) step was high, at a level similar to that of the vinyl chloride polymer of Example 1, but thixotropy was 38%, showing a relatively low recovery rate, while a phenomenon occurred in which yield stress in a low shear region in the fourth (ramp-down) step was significantly reduced, and viscosity in a high shear region (500 s$^{-1}$) was increased.

may not be used in spray coating, for example, automotive underbody coating or sealant coating.

In contrast, with respect to the vinyl chloride polymers of Examples 1 to 4 according to the present invention, since a decrease in yield stress in the low shear region of the fourth step was not large while generally having high levels of yield stress in the low shear region of the second step and yield stress in the low shear region of the fourth step, thixotropies were respectively 72%, 67%, 77%, and 71%, showing excellent recovery rates, and low viscosity characteristics in the high shear region were obtained.

The above results indicated that each of the vinyl chloride polymers of Examples 1 to 4 may have the above-described flow characteristics and viscosity characteristics by having the particle size distribution characteristics as illustrated in Table 1.

Thus, since the vinyl chloride-based polymer according to the present invention may exhibit high viscosity characteristics in the low shear region and low viscosity characteristics in the high shear region, the vinyl chloride-based polymer according to the present invention may be easily used in paste processing including spray coating such as automotive underbody coating or sealant coating.

The invention claimed is:
1. A vinyl chloride-based polymer, with a particle size distribution which represents a weight ratio of polymer particles belonging to a certain particle diameter range to total polymer particles, wherein 65 wt % to 80 wt % of the weight of the total polymer particles has a particle diameter of 0.1 μm to 0.29 μm, wherein 20 wt % to 35 wt % of the weight of the total polymer particles has a particle diameter of 0.3 μm to 3.0 μm, wherein the polymer particles having a particla diameter of 0.3 μm to 3.0 μm comprise polymer particles having a particle diameter of 1.0 μm to 3.0 μm, and wherein the polymer has a peak particle diameter ($D_p$) of 0.17 μm to 0.29 μm.

2. The vinyl chloride-based polymer of claim 1, wherein the polymer has a viscosity of 1.3 Pa·s to 2.4 Pa·s at a shear rate of 500 $s^{-1}$.

3. The vinyl chloride-based polymer of claim 1, wherein the polymer has a yield stress of 110 Pa to 260 Pa at a shear rate of 10 $s^{-1}$.

4. A method of preparing the vinyl chloride-based polymer of claim 1, the method comprising emulsion polymerization of a vinyl chloride-based monomer in the presence of seed particles, wherein the seed particles have an average particle diameter of 0.1 μm to 1.0 μm, wherein a first emulsifier, a second emulsifier, and a water-soluble polymerization initiator are used in the emulsion polymerization, and the second emulsifier is continuously added after initiation of the emulsion polymerization.

5. The method of claim 4, wherein the seed particles are used in an amount of 0.5 part by weight to 1.5 parts by weight based on 100 parts by weight of the vinyl chloride-based monomer.

6. The method of claim 4, wherein the seed particles are prepared by performing emulsion polymerization after adding the vinyl chloride-based monomer to a polymerization reactor and performing homogenization.

7. The method of claim 6, wherein the homogenization is performed for 1 hour to 3 hours using a homogenizer at a temperature of 20° C. or less.

8. The method of claim 4, further comprising at least one of washing, coagulating, and drying, after the emulsion polymerization.

9. A plastisol comprising the vinyl chloride-based polymer of claim 1.

10. The plastisol of claim 9, wherein the plastisol comprises 40 parts by weight to 120 parts by weight of a plasticizer based on 100 parts by weight of the vinyl chloride-based polymer.

11. The method of claim 4, wherein the first emulsifier and the second emulsifier each is at least one selected from the group consisting of sodium lauryl sulfate, lauryl benzene sulfonic acid, alpha-olefin sulfonate, sodium lauryl ethoxylated sulfate, sodium octadecyl sulfate, sodium lauryl ether sulfate, and linear alkylbenzene sulfonate.

* * * * *